US012189034B2

(12) United States Patent
Song et al.

(10) Patent No.: US 12,189,034 B2
(45) Date of Patent: Jan. 7, 2025

(54) METHOD AND DEVICE FOR CONTROLLING MOBILE TARGET ROBOT FOR SENSOR CALIBRATION

(71) Applicant: KAKAO MOBILITY CORP., Gyeonggi-do (KR)

(72) Inventors: Seung Kwan Song, Gyeonggi-do (KR); Min Ho Lee, Gyeonggi-do (KR); In Gyu Lee, Gyeonggi-do (KR); Seung Hwan Hong, Gyeonggi-do (KR)

(73) Assignee: KAKAO MOBILITY CORP., Gyeonggi-do (KR)

( * ) Notice: Subject to any disclaimer, the term of this patent is extended or adjusted under 35 U.S.C. 154(b) by 261 days.

(21) Appl. No.: 18/085,531

(22) Filed: Dec. 20, 2022

(65) Prior Publication Data

US 2024/0183984 A1    Jun. 6, 2024

(30) Foreign Application Priority Data

Dec. 5, 2022  (KR) .......................... 10-2022-0167821

(51) Int. Cl.
*G01S 17/89*   (2020.01)
*G01S 17/86*   (2020.01)
(Continued)

(52) U.S. Cl.
CPC .............. *G01S 17/89* (2013.01); *G01S 17/86* (2020.01); *G05D 1/0246* (2013.01);
(Continued)

(58) Field of Classification Search
CPC ........ G01S 17/89; G01S 17/86; G01S 7/4972; G01S 17/931; G01S 7/497; G05D 1/0246;
(Continued)

(56) References Cited

U.S. PATENT DOCUMENTS 12,092,771 B2 *   9/2024  Couture .................... G06T 7/80
2015/0202776 A1 *  7/2015  Atohira ................. B25J 9/1671
901/47

(Continued)

*Primary Examiner* — Behrang Badii
(74) *Attorney, Agent, or Firm* — IP Legal Services, LLC

(57) ABSTRACT

According to an embodiment of the present disclosure, there is provided a method for controlling a mobile target robot for sensor calibration. The method comprising: receiving observation data and position data measured by at least one sensor mounted on a mobile target robot from the mobile target robot, while the mobile target robot moves in a certain space where a sensor platform is placed; setting a preset position of the sensor platform as origin of coordinates based on the observation data and the position; transforming position of the mobile target robot and position of a mobile target connected to the mobile target robot into position centered on the origin of coordinates; setting a virtual reference area for performing sensor calibration based on sensor parameters including at least one of a position, direction, field of view (FOV) or focal length or combination thereof of at least one sensor provided in the sensor platform; and controlling the mobile target robot and the mobile target such that the mobile target is located in the set virtual reference area based on the transformed position of the mobile target robot and the transformed position of the mobile target.

12 Claims, 11 Drawing Sheets

(51) Int. Cl.
*G05D 1/00* (2006.01)
*B60W 50/02* (2012.01)
*B60W 60/00* (2020.01)

(52) U.S. Cl.
CPC . *B60W 50/0205* (2013.01); *B60W 2050/0215* (2013.01); *B60W 60/00* (2020.02)

(58) Field of Classification Search
CPC ............ B60W 50/0205; B60W 60/00; B60W 2050/0215; B25J 9/1679; B25J 5/00; B25J 9/162; G01D 18/00; G06F 3/048
See application file for complete search history.

(56) References Cited

U.S. PATENT DOCUMENTS

2021/0215811 A1\* 7/2021 Couture ................. G05D 1/628
2022/0319251 A1\* 10/2022 Nee ....................... G01S 7/4086

\* cited by examiner

FIG. 2
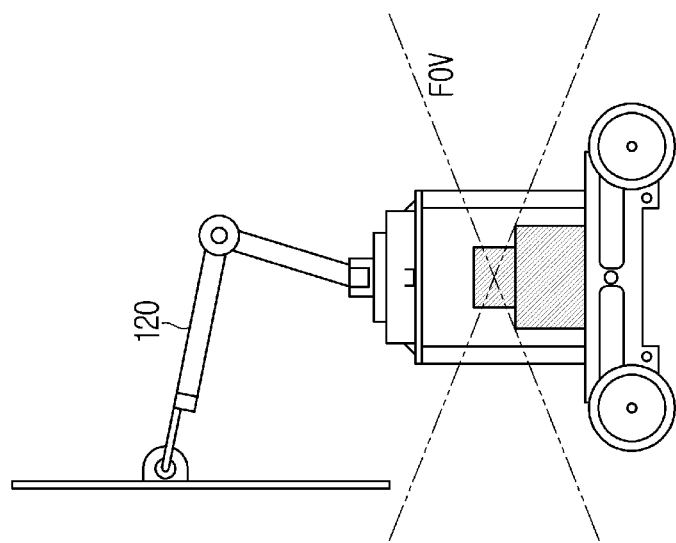
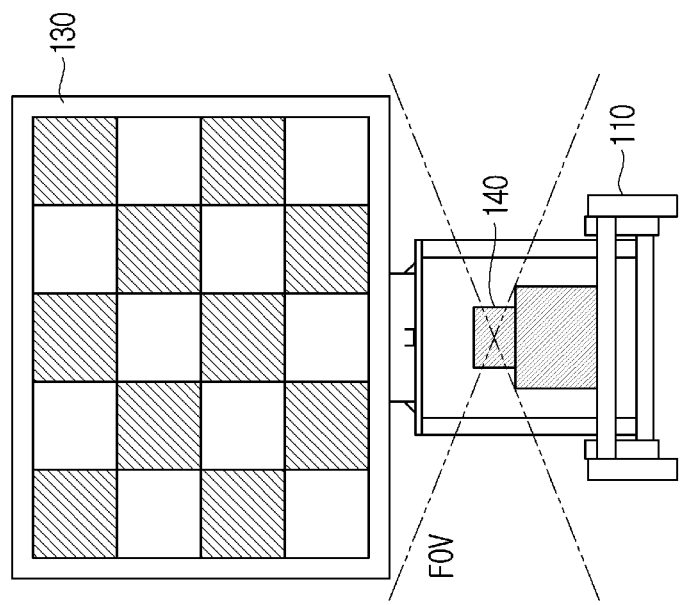

METHOD AND DEVICE FOR CONTROLLING MOBILE TARGET ROBOT FOR SENSOR CALIBRATION

CROSS REFERENCE TO RELATED APPLICATION

The present application claims priority to Korean Patent Application No. 10-2022-0167821, filed Dec. 5, 2022, the entire contents of which is incorporated herein for all purposes by this reference.

BACKGROUND OF THE INVENTION

1. Field of the Invention

The present disclosure relates to technology for controlling a mobile target robot for sensor calibration, and more particularly, to a method and device for defining coordinates of a mobile target based on a sensor platform and controlling a mobile target robot for calibrating a sensor of the sensor platform using the defined coordinates of the mobile target.

2. Description of the Related Art

Recently, LiDAR, RADAR, camera, and navigation sensors are applied in various ways to mobile systems that may operate without user intervention, such as autonomous vehicles, robots, and drones. In particular, system platforms are operating in the form of sensor fusion of multiple sensors rather than a single sensor. For precise sensor fusion, it is necessary to accurately estimate the position, posture, and sensor parameter values of each sensor by applying calibration technology, which inevitably not only requires a lot of time and manpower, but also requires a lot of spaces and costs for calibration.

For example, an autonomous vehicle may recognize an object using an installed camera, and perform functions such as avoiding the object, tracking the object, and maintaining a distance. At this time, in order to accurately determine and control the vehicle, it is necessary to calculate distance and direction values between the object recognized by the camera and the vehicle. For this, values such as camera position, posture, focal length, focal point position, lens distortion, etc. are required, and parameter values provided when manufacturing camera products have errors. Therefore, it is required to find parameters that minimize the errors using specific targets or techniques.

Conventionally, in order to find the parameters, a specific target is installed, a camera is moved, sufficient reference observation values are collected, and sensor parameters are estimated through the collected observation values. In order to obtain sufficient observation values during this process, since values such as distance and angle between the sensor and the target shall be guaranteed, a specific calibration room or device is required.

However, in general, autonomous vehicles and robots are mass-produced in a state in which sensors are installed on the platform, and calibration shall be performed in a state in which the sensors are installed on the platform, which inevitably requires larger space, cost, and time. Moreover, when there are various types of platforms and sensor arrangements, it is difficult to set a separate calibration space.

In addition, periodic or non-periodic calibration operation is frequently required depending on platform operation, and, if it is difficult to perform accurate calibration, it may act as a fatal error related to passenger safety when operating an autonomous vehicle.

SUMMARY OF THE INVENTION

An object of the present disclosure is to provide a method and device for defining coordinates of a mobile target based on a sensor platform and controlling a mobile target robot for calibrating a sensor of the sensor platform using the defined coordinates of the mobile target.

Other objects and advantages of the present invention will become apparent from the description below and will be clearly understood through embodiments. In addition, it will be easily understood that the objects and advantages of the present disclosure may be realized by means of the appended claims and a combination thereof.

Disclosed herein method and device for controlling a mobile target robot for sensor calibration. According to an embodiment of the present disclosure, there is provided a method for controlling a mobile target robot for sensor calibration. The method comprising: receiving observation data and position data measured by at least one sensor mounted on a mobile target robot from the mobile target robot, while the mobile target robot moves in a certain space where a sensor platform is placed; setting a preset position of the sensor platform as origin of coordinates based on the observation data and the position data; transforming position of the mobile target robot and position of a mobile target connected to the mobile target robot into position centered on the origin of coordinates; setting a virtual reference area for performing sensor calibration based on sensor parameters including at least one of a position, direction, field of view (FOV) or focal length or combination thereof of at least one sensor provided in the sensor platform; and controlling the mobile target robot and the mobile target such that the mobile target is located in the set virtual reference area based on the transformed position of the mobile target robot and the transformed position of the mobile target.

According to the embodiment of the present disclosure, wherein the transforming comprises transforming the position of the mobile target into position centered on the origin of coordinates, based on the position of the mobile target centered on the mobile target robot, the transformed position of the mobile target robot and transform information set to match coordinates of the sensor platform with the mobile target robot, and calculating a direction vector of the mobile target centered on the origin of coordinates based on a direction vector of the mobile target centered on the mobile target robot and the transform information.

According to the embodiment of the present disclosure, wherein the setting as the origin of coordinates comprises setting the origin of coordinates through user input when a graphic user interface (GUI) for the sensor platform is provided by the observation data.

According to the embodiment of the present disclosure, wherein the setting as the origin of coordinates comprises, when the observation data is measured by a LiDAR and a camera and the sensor platform is a vehicle, three-dimensionally modeling the vehicle based on the observation data, detecting rear wheels of the vehicle through the three-dimensional modeling, and automatically setting coordinate information between the detected rear wheels as the origin of coordinates.

According to the embodiment of the present disclosure, wherein the setting the virtual reference area comprises setting the virtual reference area in consideration of the FOV and focal length of the at least one sensor.

According to the embodiment of the present disclosure, wherein the setting the virtual reference area comprises, when the sensor platform includes a LiDAR sensor and a camera sensor, setting the virtual reference area in consideration of a FOV of the LiDAR sensor and a FOV of the camera sensor.

According to the embodiment of the present disclosure, wherein the setting the virtual reference area comprises determining a distance between the LiDAR sensor and the mobile target and a distance between the camera sensor and the mobile target in consideration of an area of interest of the LiDAR sensor and a focal length of the camera sensor and setting the virtual reference area using each of the determined distances, the FOV of the LiDAR sensor and the FOV of the camera sensor.

According to the embodiment of the present disclosure, wherein the setting the virtual reference area comprises setting each of an area where the FOV of the LiDAR sensor and the FOV of the camera sensor overlap, a FOV area of only the LiDAR sensor and a FOV area of only the camera sensor as the virtual reference area.

According to the embodiment of the present disclosure, wherein the controlling comprises controlling the mobile target robot and the mobile target to satisfy a condition that an error between position of the virtual reference area and position of the mobile target centered on the origin of coordinates is smaller than a preset position error and an error between a direction vector of the virtual reference area and a direction vector of the mobile target centered on the origin of coordinates is smaller than a preset direction error.

According to the embodiment of the present disclosure, wherein the controlling comprises, when there is a combination satisfying the condition among combinations of joint angles of a manipulator attached to the mobile target robot to control an angle of the mobile target, controlling the joint angles of the manipulator such that the mobile target is located in the virtual reference area, after controlling the position of the mobile target robot.

According to the embodiment of the present disclosure, wherein the controlling comprises, when there is no combination satisfying the condition among the combinations of the joint angles of the manipulator, initializing the joint angles of the manipulator, adjusting the position of the mobile target robot by a certain interval and then performing a process of determining whether there is a combination satisfying the condition again.

According to another embodiment of the present disclosure, there is provided a device for controlling a mobile target robot for sensor calibration. The device comprising: a reception unit configured to receive observation data and position data measured by at least one sensor mounted on a mobile target robot from the mobile target robot, while the mobile target robot moves in a certain space where a sensor platform is placed; a reference setting unit configured to set a preset position of the sensor platform as origin of coordinates based on the observation data and the position data; a transform unit configured to transform position of the mobile target robot and position of a mobile target connected to the mobile target robot into position centered on the origin of coordinates; an area setting unit configured to set a virtual reference area for performing sensor calibration based on sensor parameters including at least one of a position, direction, field of view (FOV) or focal length or combination thereof of at least one sensor provided in the sensor platform; and a controller configured to control the mobile target robot and the mobile target such that the mobile target is located in the set virtual reference area based on the transformed position of the mobile target robot and the transformed position of the mobile target.

The features briefly summarized above with respect to the present disclosure are merely exemplary aspects of the detailed description below of the present disclosure, and do not limit the scope of the present disclosure.

According to the present disclosure, it is possible to provide a method and device for defining coordinates of a mobile target based on a sensor platform and controlling a mobile target robot for calibrating a sensor of the sensor platform using the defined coordinates of the mobile target.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features and other advantages of the present invention will be more clearly understood from the following detailed description taken in conjunction with the accompanying drawings, in which:

FIG. 2 illustrates a configuration of an embodiment of a mobile target robot moving a mobile target;

DESCRIPTION OF THE PREFERRED EMBODIMENTS

Figure 1:
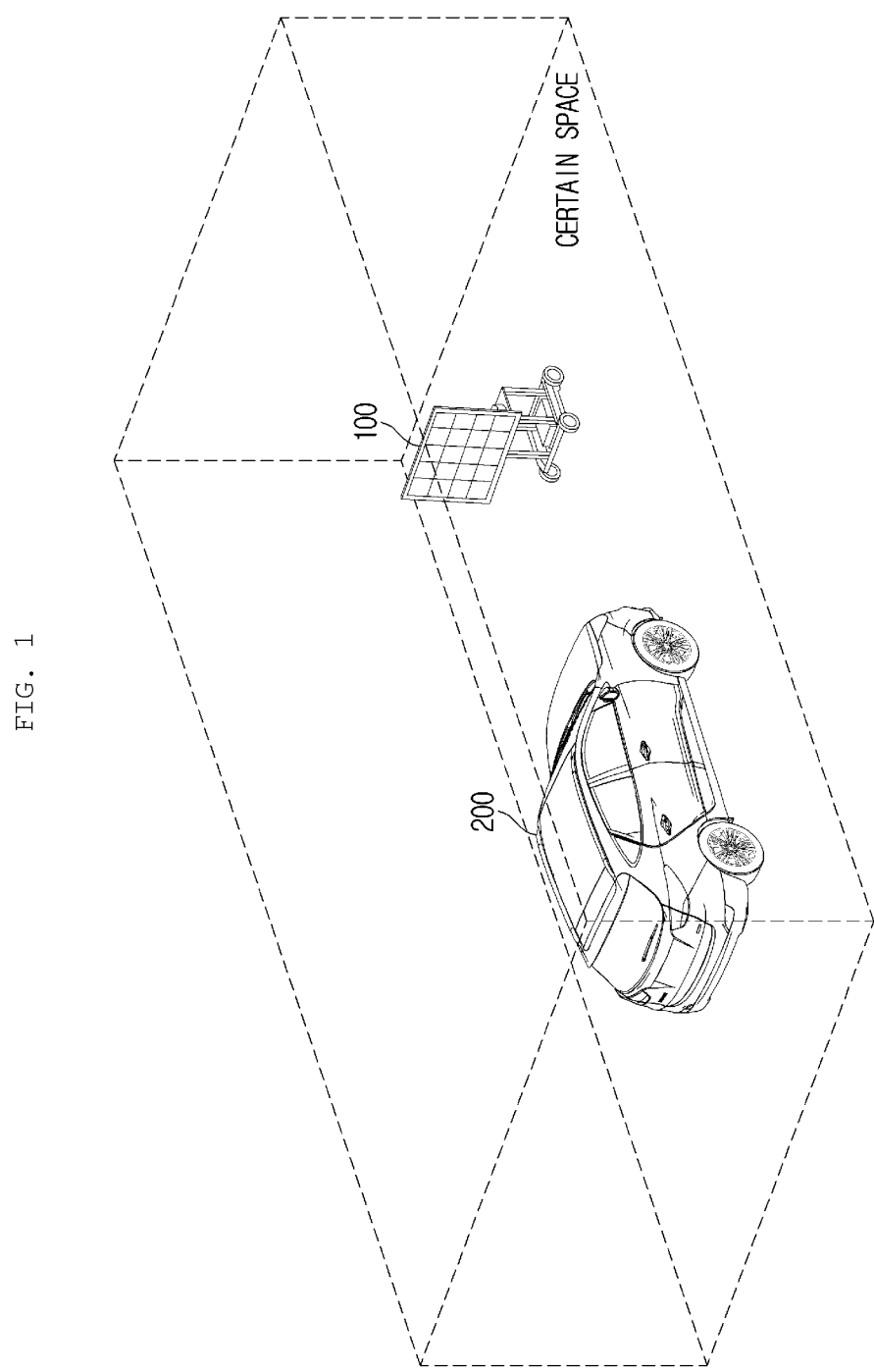
FIG. 1 illustrates a configuration of a system for explaining a mobile target control device of the present disclosure.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

In the present document, such phrases as 'A or B', 'at least one of A and B', 'at least one of A or B', 'A, B or C', 'at least one of A, B and C' and 'at least one of A, B or C' may respectively include any one of items listed together in a corresponding phrase among those phrases or any possible combination thereof.

FIG. 1 illustrates a configuration of a system for explaining a mobile target control device of the present disclosure. As shown in FIG. 1, the system includes an autonomous vehicle 200 having a mobile target control device in a certain space and a mobile target robot 100.

The certain space of FIG. 1 means a space for calibrating a sensor provided in the autonomous vehicle 200, and may mean a closed space where walls and pillars are located nearby, such as a parking lot, rather than an open space.

The mobile target control device of the present disclosure may be implemented by a separate device, such as a computer or a server, which may perform data transmission/reception and control while communicating with the mobile target robot 100 and the sensor platform 200 through a network.

The autonomous vehicle 200 may include a two-dimensional (2D) observation sensor, a three-dimensional (3D) observation sensor, a navigation sensor that provides positioning information and navigation information such as speed, position, and posture of the sensor platform. The autonomous vehicle 200 may include a plurality of sensors, but is not limited thereto, and may include only a single sensor. Hereinafter, for convenience of description, it is described as having a LiDAR sensor and a camera sensor, but the following description may be practically applied even in the case of a single sensor.

The 2D observation sensor is mounted on the ground or an airborne mobile platform to obtain observation data for video by taking images of surrounding objects, such as terrain and features, and may be a surveying or non-surveying camera or a stereo camera, but is not limited thereto.

The 3D observation sensor is mounted on a mobile platform and obtains observation data for 3D surveying by obtaining 3D geographic data related to surrounding objects, such as data related to terrain and features and is an active remote sensing sensor. For example, the 3D observation sensor may be a LiDAR (Light Detection and Ranging) sensor using a laser. Such a LiDAR sensor scans a laser beam at an object to acquire data and detects a time difference and energy change of an electromagnetic wave returning after being reflected from the object to calculate a distance to the object and reflection intensity. Also, the 3D observation sensor may be a sensor that detects 3D shape, color, and distance information using a laser.

A navigation sensor acquires observation data for navigation by detecting navigation information such as positioning information, platform position, posture, and speed and may include a GNSS, an IMU sensor, a navigation sensor, etc. which may collect position and direction information of the autonomous vehicle.

The mobile target robot 100 is to move a mobile target for calibrating a sensor of the autonomous vehicle 200, and, as shown in FIG. 2, the mobile robot 110, a mobile target angle control unit (e.g., for example, a manipulator) 120, a mobile target 130, and an observation sensor 140 including a LiDAR. Although, in FIG. 2, the mobile target device 100 is illustrated as including only the LiDAR 140, but is not limited thereto, and may include other observation sensors such as a camera and a laser.

The mobile target robot 100 is a robot for placing a mobile target at a desired position for sensor calibration, and embodiments of the present disclosure are to accurately perform sensor calibration by controlling the mobile target device.

The manipulator 120, which is a mobile target angle control unit, is attached to the mobile robot 110, and the mobile target 130, for example, a checker board, may be attached to an end-point of the manipulator 120.

In order to define the coordinates of the mobile robot 110 centered on the vehicle, the position of the mobile robot 100 centered on the vehicle 200 shall be measured. In general, sensors used for positioning include a camera, a LiDAR, a UWB sensor, and the like, but, in the present disclosure, a positioning method using only a LiDAR sensor will be described. For positioning, a multi-channel LiDAR is placed horizontally on the mobile robot 110 and provided with a SLAM (Simultaneous Localization and Mapping) algorithm, enabling indoor positioning in a closed space. When the mobile robot 110 rotates around the vehicle as a whole and performs scan, point cloud data for the vehicle and the space around the vehicle is formed, and a space where the floor, ceiling, and walls are present is advantageous in indoor positioning using LiDAR, thereby compensating for a disadvantage that the LiDAR itself is reflected on the surface of the vehicle to cause poor positioning.

The mobile target robot 100 measures the observation data using an observation sensor such as a multi-channel LiDAR while moving in a certain space where the vehicle is placed, obtains the position data based on the measured observation data, and transmits the obtained position data and the measured observation data to the mobile target control device, and the mobile target control device may transform the position of the certain space centered on the vehicle and control the mobile target robot 100, for example, the mobile robot 110 and the manipulator 120 through this.

Figure 3:
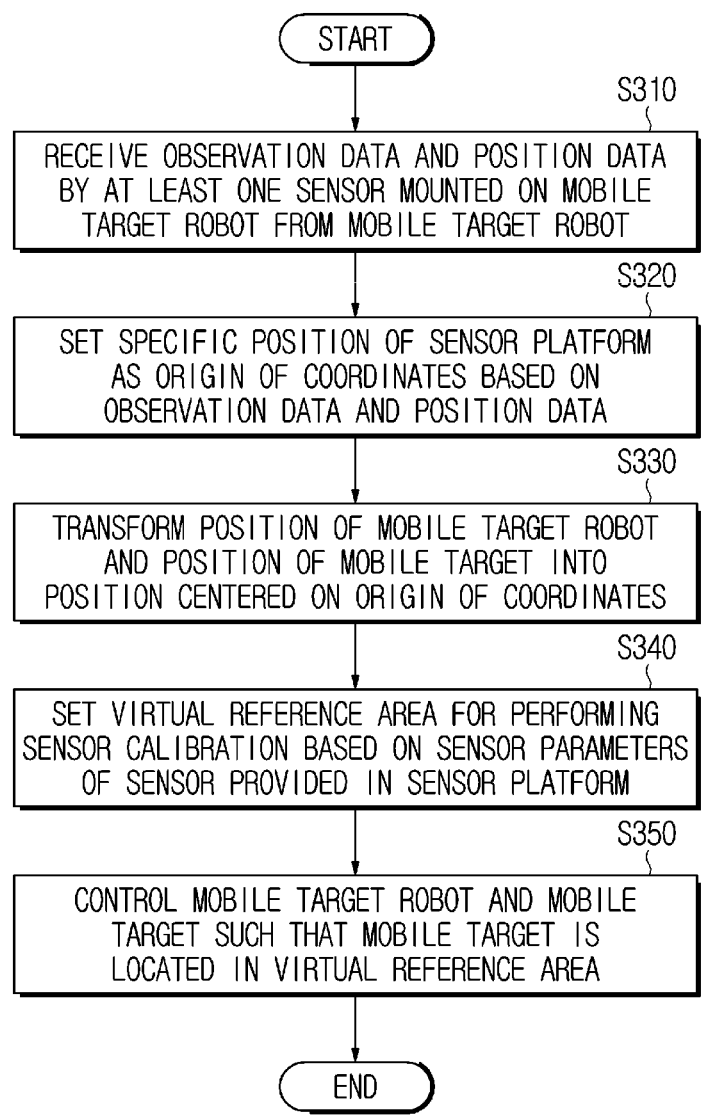
FIG. 3 is a flowchart illustrating a mobile target robot control method according to an embodiment of the present disclosure.

FIG. 3 is a flowchart illustrating a mobile target robot control method according to an embodiment of the present disclosure, and is an operational flowchart in the mobile target control device.

Referring to FIG. 3, in the mobile target robot control method according to an embodiment of the present disclosure, observation data measured by an observation sensor, such as a multi-channel LiDAR, and position data obtained based on the observation data is received from a mobile target robot while the mobile target robot moves in a certain space where a sensor platform is placed, and a preset position of the vehicle as a sensor platform is set as origin of coordinates based on the observation data and the position data received from the mobile target robot (S310 and S320).

Figure 5:
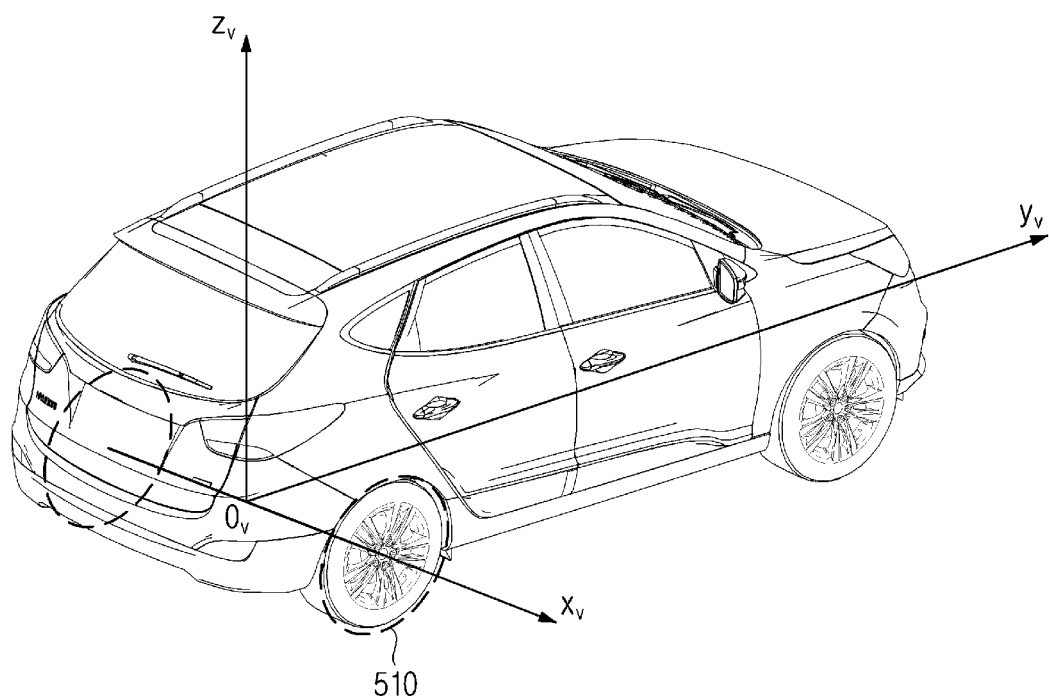
FIG. 5 is an exemplary view of origin of coordinates.

In some embodiments, in step S320, when a graphic user interface (GUI) for the certain space and vehicle is provided by the received observation data and position data, the origin of coordinates may be set through user input. For example, in step S320, point cloud data for the certain space is displayed on the GUI, and, as shown in FIG. 5, when a user sets the origin of coordinates of the vehicle displayed on the GUI as the center positions between the rear wheels 510 of the vehicle, the positions may be defined as vehicle origin of coordinates Ov.

Here, the GUI provides the FOV of the vehicle, the space around the vehicle, and the sensors mounted on the vehicle, visually shows the position and posture control values of the mobile target, and provides the following main functions.

1) Definition of Vehicle Reference Coordinate System and Definition of Floor and Wall When a mobile target robot provided with sensors such as horizontal LiDAR and IMU travels around a vehicle and performs SLAM, point cloud data is generated for the space around the vehicle and the vehicle. The user may find the origin of coordinates of the rear wheels of the vehicle based on the point cloud data, designate XYZ coordinates, and define the average value of the left and right rear wheels as the origin of the vehicle, that is, the origin of coordinates. In addition, the user may define the floor plane (XY plane) by defining any 3 points on the horizontal floor based on the point cloud data, and set the gravity direction of the installed IMU sensor to the Z direction. Wall and ceiling information may be defined by defining any 3 points in the same way, and a vehicle reference coordinate system may be generated by selecting by selecting the origin of the vehicle and the floor plane or Z direction.

2) Placement of Vehicle and Sensor and Setting of FOV

Based on the vehicle point cloud data, the volume of the vehicle may be expressed in the form of a hexahedron, or if there is 3D modeling information of the vehicle, the position and posture may match based on the point cloud data using the 3D modeling information.

Figure 7:
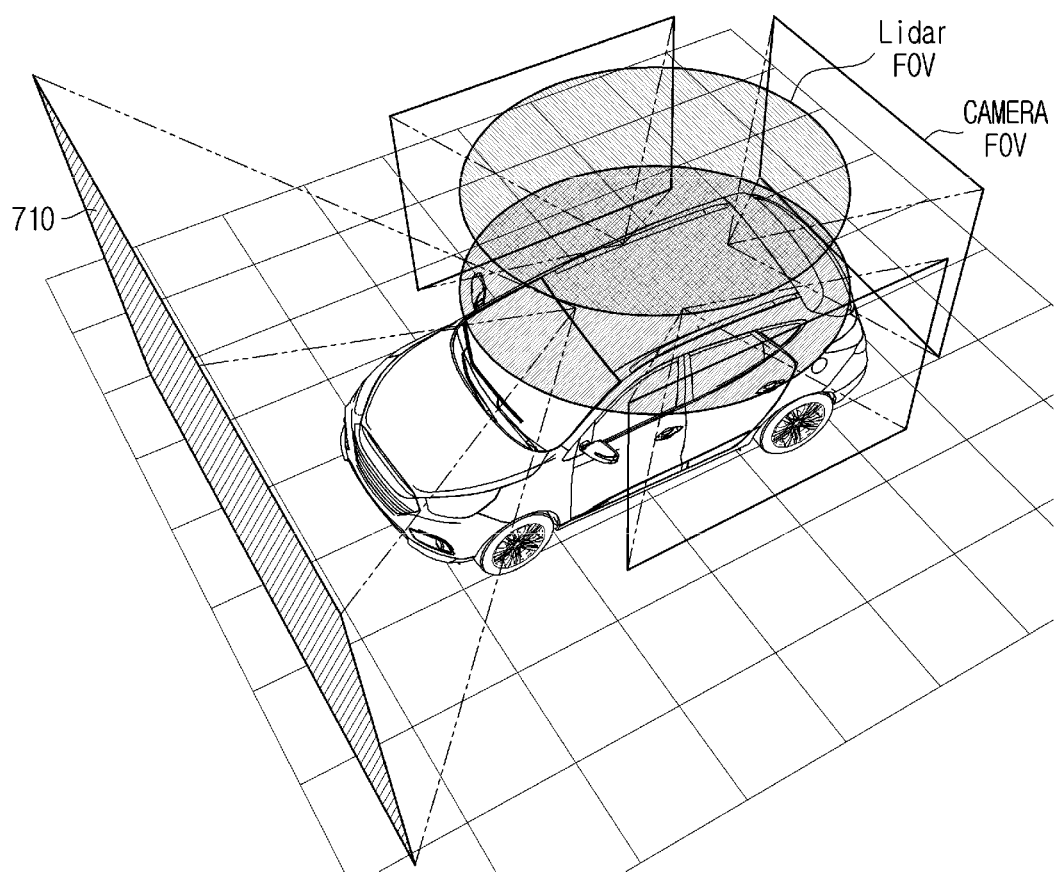
FIG. 7 is an exemplary view of a FOV of a camera and a LiDAR.

As information on sensors such as LiDAR, camera, RADAR, and antenna, position, direction, FOV, etc. may be set. In the case of an antenna, since there is no directionality, only XYZ information is required, and in the case of a rotational LiDAR and camera, since there is directionality, not only XYZ but also roll, pitch, and yaw information for a heading direction are input and set. In addition, as shown in FIG. 7, the LiDAR may define an area other than the FOV in an hourglass shape, and, since the camera has a quadrangular-pyramid-shaped FOV, this information may also be visually expressed. The checkerboard of FIG. 7 shows the floor surface.

3) Expression of Position and Posture of Mobile Target Robot

The position of the mobile target robot may be obtained from the LiDAR SLAM and the vehicle reference coordinate system, and the position and posture of the mobile target may be expressed in 3D modeling based on the generated floor surface.

4) Setting of Safety Boundary Area

Through 1) to 3) above, the vehicle and wall may be defined as areas where the mobile target robot shall not travel, and the safety boundary area may be designated by setting coordinates based on the floor surface for an area where access of the mobile target robot is restricted and the pillar.

5) When the defined FOV of the sensor is visually displayed on the GUI, the position of the mobile target robot may be effectively designated. For example, if a camera image plane definition (710 in FIG. 7) becomes a virtual reference area, since the mobile target may be placed by dividing the center area and the corner area of the camera, sensor calibration may be performed based on the virtual reference area corresponding to the image plane definition 710.

In this way, the mobile target control device may configure a GUI based on the position and observation data received from the mobile target robot, and may set or determine a virtual reference area for performing sensor calibration by setting vehicle origin of coordinates (or origin) through the GUI and setting sensor parameters including the focal length and FOV of each sensor. This corresponds to step S340 of FIG. 3.

In addition, the position of the mobile target robot may be obtained based on the origin of coordinates of the vehicle while performing map matching with the LiDAR mounted on the mobile target robot based on the point cloud map formed as described above.

Referring to FIG. 2 again, step S320 is not limited to setting the origin of coordinates through the GUI, and, when the observation data received from the mobile target robot includes image data measured by the camera as well as point cloud data measured by the LiDAR, the vehicle may be three-dimensionally modeled based on the observation data, the rear wheels of the vehicle may be detected through 3D modeling, and coordinate information between the detected rear wheels may be automatically set as origin of coordinates. That is, when 3D modeling including the rear wheels is possible for the vehicle placed in a certain space, the origin of coordinates may be automatically set through 3D modeling.

When the origin of coordinates of the vehicle are set in step S320, the position of the mobile robot (or mobile target robot) and the position of the mobile target are transformed into position centered on the origin of coordinates (S330).

Figure 6:
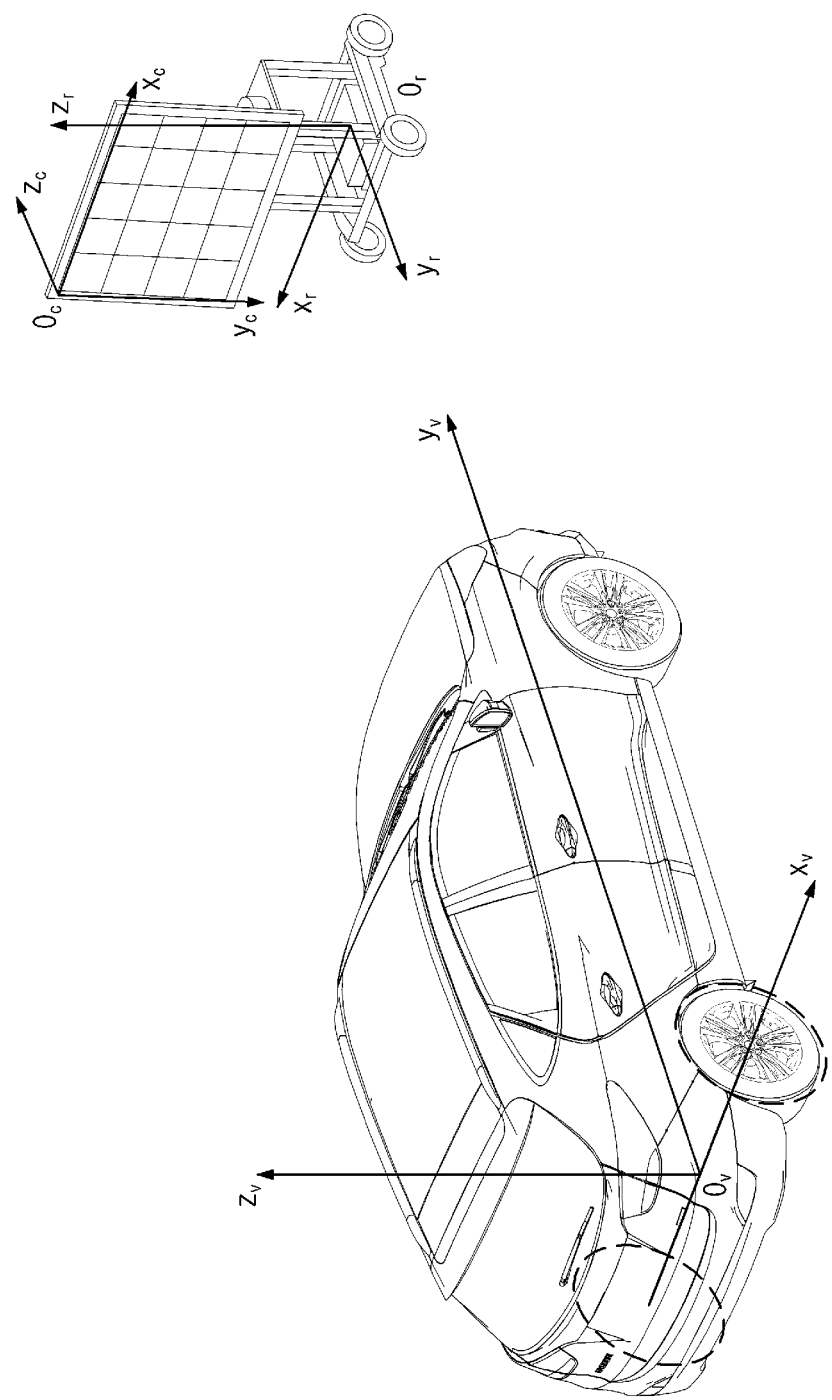
FIG. 6 is an exemplary view for explaining a position and direction vector of a mobile robot and a mobile target centered on origin of coordinates of a vehicle.

Specifically, as shown in FIG. 6, if the origin of coordinates of the vehicle are $O_v$, the coordinates of the mobile robot are $O_r$, and the coordinates of the mobile target are $O_c$, the position $X_{rv}$ of the mobile robot centered on the origin of coordinates of the vehicle is $X_{rv}=[x_{rv}, y_{rv}, 0]$, a direction vector $U_{rv}$ is $U_{rv}=[u_{rv}, v_{rv}, w_{rv}]$, the position $X_{cr}$ of the mobile target centered on the mobile robot is $X_{cr}=[x_{cr}, y_{cr}, z_{cr}]$, and a direction vector $U_{cr}$ is $U_{cr}=[u_{cv}, v_{cv}, w_{cv}]$.

On the other hand, if the position and direction vector of the mobile target are completed by an angle combination of the manipulator, this angle may be expressed as $Q=[q_1, q_2, \ldots q_n]$, which means the angle of each joint of the manipulator. Based on the origin of coordinates of the vehicle, the origin position $X_{cv}$ and the direction vector $U_{cv}$ of the mobile target may be expressed as Equation 1 and Equation 2 below.

$$X_{cv}=R_{rv}X_{cr}+X_{rv} \quad \text{[Equation 1]}$$

$$U_{cv}=R_{rv}U_{cr} \quad \text{[Equation 2]}$$

where, $R_{rv}$ may mean a rotation transformation for matching the vehicle coordinates with the mobile robot, and the rotation transformation may be obtained by three-dimensional coordinate transformation, the description of which is omitted because it is obvious to those skilled in the art in this technical field.

The position $X_{rv}$ and direction vector $U_{rv}$ of the mobile robot centered on the origin of coordinates of the vehicle are values measured by the positioning method described above, and the position $X_{cr}$ and direction vector $U_{cr}$ of the mobile target centered on the mobile robot means the value calculated from a geometric relationship including Q measured by an encoder sensor mounted in the manipulator and the length of each link of the manipulator.

In step S330, the position and direction vector of the mobile robot and the position and direction vector of the mobile target centered on the origin of coordinates of the vehicle may be obtained through the above description.

Then, a virtual reference area for performing sensor calibration is set based on sensor parameters including at least one of the position, direction, FOV, and focal length of at least one sensor provided in the vehicle (S340).

Figure 8:
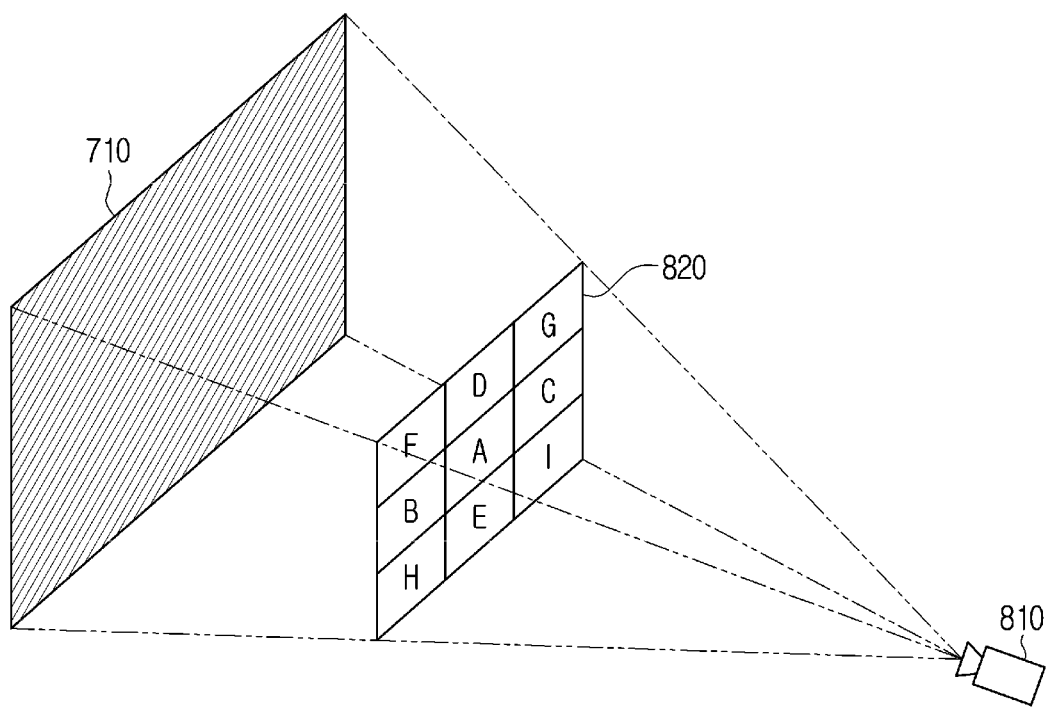
FIG. 8 is an exemplary view for explaining a virtual reference area of a camera.

In some embodiments, in step S340, a virtual reference area for performing sensor calibration may be set in consideration of the FOV and focal length of at least one sensor. For example, in step S340, as shown in FIG. 7, in the case of a camera, a camera image plane definition 710 may be automatically set as a virtual reference area in consideration of the FOV of the camera. As another example, a virtual reference area for calibrating the camera sensor may be set in the camera image plane definition 710 as well as between the camera sensor 810 and the camera image plane definition 710 as shown in FIG. 8. Although not shown, it may be set farther than the camera image plane definition 710. Here, the virtual reference area 820 of the camera sensor of FIG. 8 may be divided into a plurality of areas, for example, a central area A, left and right areas B and C, top and bottom areas D and E and corner areas F, G, H and I, for sensor calibration.

Figure 9:
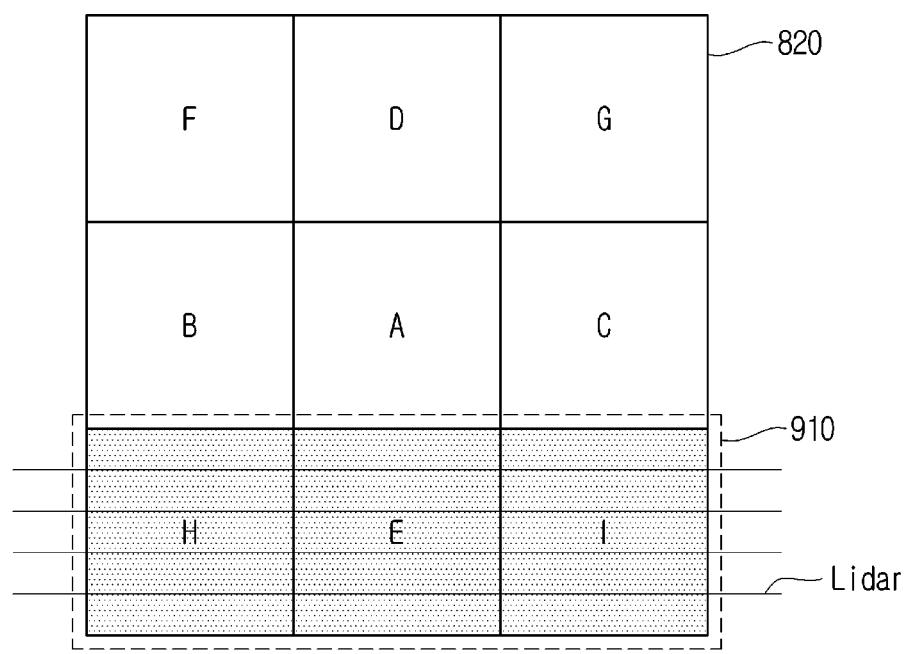
FIG. 9 is an exemplary view for explaining an overlap area of a camera and a LiDAR as a virtual reference area.

In some embodiments, in step S340, when the vehicle includes a LiDAR sensor and a camera sensor, a virtual reference area may be set in consideration of the FOV of the LiDAR sensor and the FOV of the camera sensor. At this time, in step S340, an area where the FOV of the LiDAR sensor and the FOV of the camera sensor overlap, a FOV area of only the LiDAR sensor and a FOV area of only the camera sensor may be set as a virtual reference area for performing sensor calibration. For example, in step S340, as shown in FIG. 9, when the FOV of the LiDAR sensor and the FOV of the camera sensor overlap, an area 910 where the FOV of the LiDAR sensor overlaps of the virtual reference area of the camera sensor may also be set as a virtual reference area for calibrating the LiDAR sensor and the camera sensor.

Figure 10:
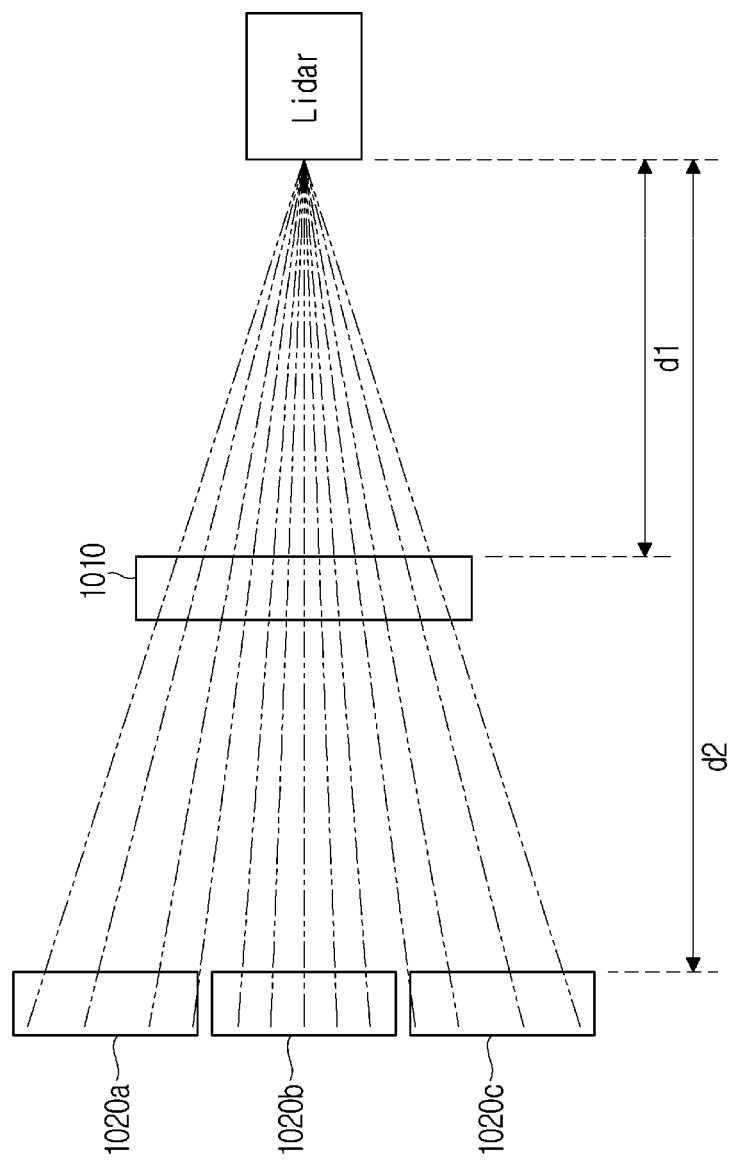
FIG. 10 is an exemplary view for explaining a virtual reference area of a LiDAR according to a distance.

In some embodiments, in step S340, a distance between the LiDAR sensor and the mobile target and a distance between the camera sensor and the mobile target are determined in consideration of an area of interest of the LiDAR sensor and the focal length of the camera sensor, and a virtual reference area of each sensor may be set using the determined distances, the FOV of the LiDAR sensor and the FOV of the camera sensor. For example, in step S340, as shown in FIG. 10, when the distance to the area of interest of the LiDAR sensor is d1, the virtual reference area 1010 may be set in consideration of the distance d1 to the area of interest and the FOV of the LiDAR sensor, and, when a distance to the area of interest of the LiDAR sensor is d2, a plurality of virtual reference areas 1020a, 1020b and 1020c may be set in consideration of the distance d2 to the area of interest and the FOV of the LiDAR sensor. Of course, in step S340, even in setting a virtual reference area in the area where the FOV of the LiDAR sensor and the FOV of the camera sensor overlap, the virtual reference area in the overlapping area may be set in consideration of the focal length of the camera and the area of interest of the LiDAR sensor.

In some embodiments, in step S340, a virtual reference area may be set based on user input when a GUI is provided. In some embodiments, in step S340, a candidate virtual reference area which may be set through the GUI may be provided based on sensor parameters including the FOV and focal length (or distance to the area of interest) of each sensor. A candidate virtual reference area selected by user input of the candidate reference area may be set as a virtual reference area for sensor calibration.

The virtual reference area set according to the above-described embodiments may include a coordinate area centered on the origin of coordinates of the vehicle and a direction vector. The coordinate area of the virtual reference area may include origin coordinates of the virtual reference area, area coordinate information representing the corresponding area, and a direction vector.

When at least one virtual reference area for performing sensor calibration is set in step S340, the mobile robot and the mobile target are controlled such that the mobile target is located in the virtual reference area set based on the position of the mobile target and the position of the mobile robot centered on the origin of coordinates of the vehicle (S350).

Figure 4:
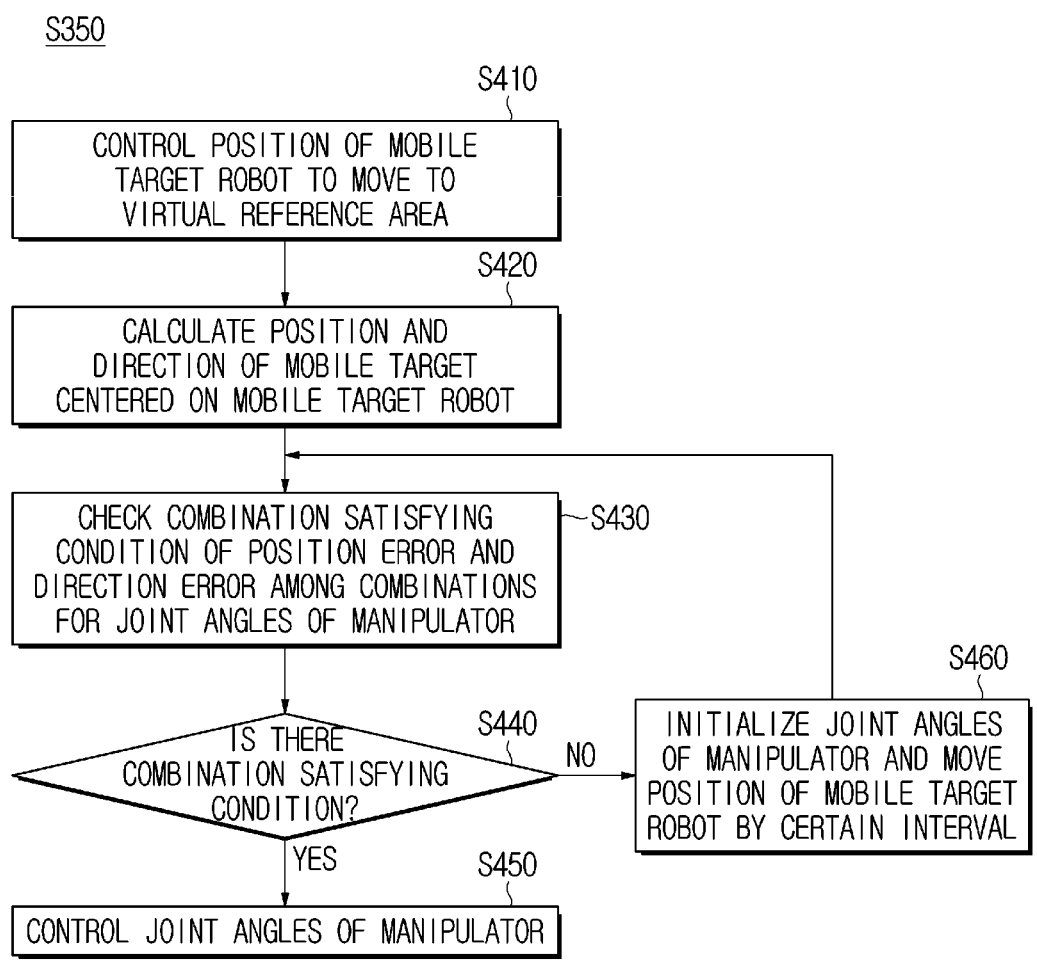
FIG. 4 is an operational flowchart of an embodiment of step S350 of FIG. 3.

In some embodiments, in step S350, as shown in FIG. 4, the position of the mobile robot is controlled based on the origin of coordinates of the vehicle so that the mobile target is moved to the set virtual reference area, and the position and direction of the mobile target are calculated based on the mobile robot (S410 and S420).

For example, in step S420, the position and direction of the mobile robot are measured based on the origin of coordinates of the vehicle using the positioning method described above, and the position and direction of the mobile target centered on the encoder value of the manipulator may be calculated by <Equation 1> and <Equation 2> above.

Then, it is checked whether there is a combination satisfying a preset condition among combinations of joint angles of the manipulator that controls the position and direction of the mobile target (S430).

Here, the condition means that an error between the position of the virtual reference area and the position of the mobile target centered on the origin of coordinates of the vehicle is smaller than a preset position error, and an error between the direction vector of the virtual reference area and the direction vector of the mobile target centered on the origin of coordinates of the vehicle is smaller than a preset direction error.

For example, when an initially set value of the manipulator is $Q_0$, the position and direction vector of the mobile target may be $X_{cr,0}$ and $U_{cr,0}$, and the purpose of controlling the mobile target is to move the position and direction vector of the mobile target centered on the origin of coordinates of the vehicle to desired values, that is, the virtual reference area ($X_{cv} \rightarrow X_{cv,desired}$, $U_{cv} \rightarrow U_{cv,desired}$), and the conditions for the position error $error_X$ and direction error $error_U$ may be expressed as <Equation 3> and <Equation 4> below.

$$\|X_{cv} - X_{cv,desired}\| < error_X \qquad \text{[Equation 3]}$$

$$\|U_{cv} \rightarrow U_{cv,desired}\| < error_U \qquad \text{[Equation 4]}$$

where, $X_{cv,desired}$ may refer to desired position for moving the mobile target, and $U_{cv,desired}$ may mean a desired direction vector for moving the mobile target.

Through the combination check in step S430, it is determined whether there is a combination satisfying the conditions of <Equation 3> and <Equation 4> and, if there is a combination $Q_{desired}$ satisfying the condition, the mobile target is accurately positioned in the virtual reference area (S440 and S450), by controlling the joint angle of the manipulator.

On the other hand, as a result of the determination in step S440, if there is no combination satisfying the condition, the joint angle of the manipulator is initialized, and then the position of the mobile robot is moved by a certain interval or by a certain position. Then, the process returns to step S430 and the process of checking whether there is a combination satisfying the condition is performed again (S460).

Here, the certain interval or the certain position by which the mobile robot is moved may be determined by an operator or an individual who provides the technology of the present disclosure, and may be determined in consideration of the information on the joint angles when information on the joint angles of the manipulator is known.

As such, the mobile target robot control method according to the embodiment of the present disclosure may define coordinates of a mobile target for performing sensor calibration based on a sensor platform such as an autonomous vehicle, and improve calibration performance for the sensors of the sensor platform using the defined coordinates of the mobile target.

Figure 11:
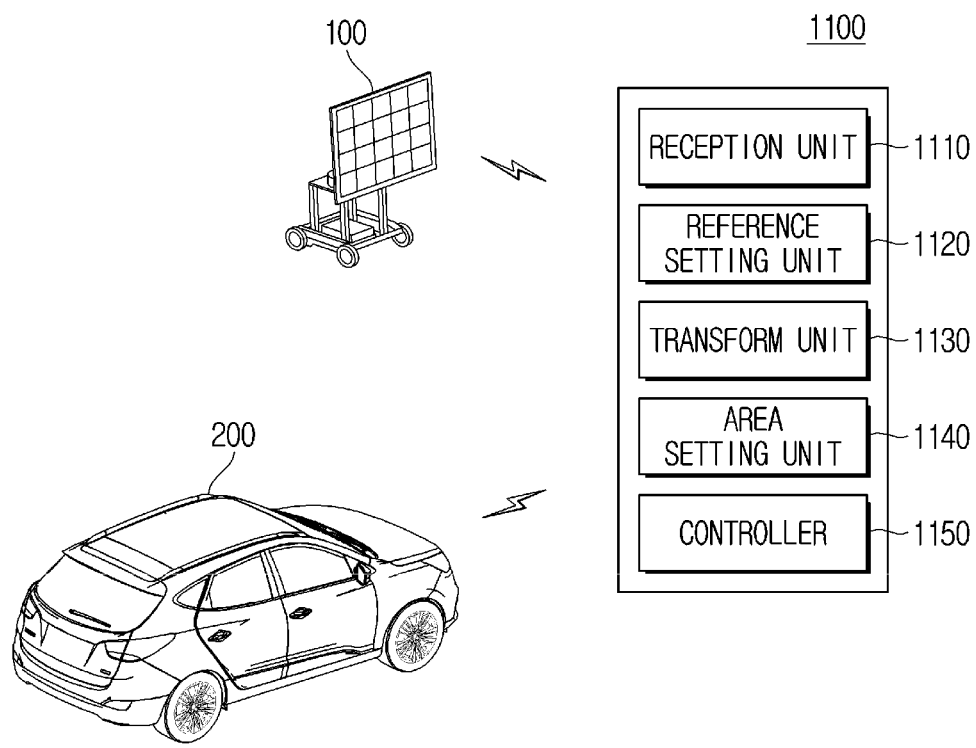
FIG. 11 illustrates a configuration of a mobile target robot control device according to another embodiment of the present disclosure.

FIG. 11 illustrates a configuration of a mobile target robot control device according to another embodiment of the present disclosure, and the mobile target robot control device 1100 may communicate with the mobile target robot 100 and the vehicle 200 as a sensor platform through a network and transmit/receive data or transmit control signals with the mobile target robot 100 and the vehicle 200 through the network.

Referring to FIG. 11, a mobile target robot control device 1100 according to another embodiment of the present disclosure includes a reception unit 1110, a reference setting unit 1120, a transform unit 1130, an area setting unit 1140 and a controller 1150.

The reception unit 1110 receives observation data measured by an observation sensor and position data obtained based on the observation data from the mobile target robot 100, while the mobile target robot 100 moves in a certain space where the sensor platform is placed.

The reference setting unit 1120 sets a preset position of the sensor platform as origin of coordinates based on the observation data and the position data.

In some embodiments, the reference setting unit 1120 may set the origin of coordinates through user input when a graphic user interface (GUI) for the certain space and the vehicle is provided by the received observation data and position data.

In some embodiments, when the observation data includes image data measured by the camera as well as point cloud data measured by the LiDAR, the reference setting unit 1120 may three-dimensionally model the vehicle 200 based on the observation data, detect rear wheels of the vehicle through 3D modeling and automatically set coordinate information between the detected rear wheels as origin of coordinates.

The transform unit 1130 transforms the position of the mobile target robot 100 and the position of the mobile target connected to the mobile target robot 100 into position centered on the origin of coordinates, that is, the origin of coordinates of the vehicle 200 as the sensor platform.

In this case, the transform unit 1130 may calculate the position and direction vector of the mobile target centered on the origin of coordinates of the sensor platform through <Equation 1> and <Equation 2> above.

The area setting unit 1140 sets a virtual reference area for performing sensor calibration based on sensor parameters including at least one of the position, direction, FOV, and focal length of at least one sensor provided in the sensor platform.

In some embodiments, the area setting unit 1140 may set the virtual reference area for performing sensor calibration in consideration of the FOV and focal length of at least one sensor.

In some embodiments, when the vehicle includes a LiDAR sensor and a camera sensor, the area setting unit may set the virtual reference area in consideration of the FOV of the LiDAR sensor and the FOV of the camera sensor. In this case, the area setting unit 1140 may set an area where the FOV of the LiDAR sensor and the FOV of the camera sensor overlap, a FOV area of only the LiDAR sensor and a FOV area of only the camera sensor as a virtual reference area for sensor calibration.

In some embodiments, the area setting unit 1140 may determine a distance between the LiDAR sensor and the mobile target and a distance between the camera sensor and the mobile target in consideration of a distance to an area of interest of the LiDAR sensor and the focal length of the camera sensor, and set a virtual reference area of each sensor using the FOV of the LiDAR sensor and the FOV of the camera sensor.

In some embodiments, when a GUI is provided, the area setting unit 1140 may set a virtual reference area based on user input.

The controller 1150 controls the mobile target robot 100 and the mobile target such that the mobile target is located in the set virtual reference area based on the position of the mobile target robot and the position of the mobile target transformed by the transform unit 1130.

In some embodiments, the controller 1150 may control the mobile target robot 100 and the mobile target to satisfy the condition that an error between the position of the virtual reference area and the position of the mobile target centered on the origin of coordinates is smaller than a preset position error, and an error between the direction vector of the virtual reference area and the direction vector of the mobile target centered on the origin of coordinates is smaller than a preset direction error.

In some embodiments, the controller 1150 may control the joint angles of the manipulator such that the mobile target is located in the virtual reference area, when there is a combination satisfying the condition among combinations of the joint angles of the manipulator attached to the mobile target robot 100 to control the angle of the mobile target, after controlling the position of the mobile target robot 100.

In some embodiments, when there is not combination satisfying the condition among the combinations for the joint angles of the manipulator, the controller 1150 may initialize the joint angles of the manipulator, adjust the position of the mobile target robot 100 by a certain interval, and then perform a process of checking whether there is a combination satisfying the condition again.

Even if the description is omitted in the device of FIG. 11, the device according to another embodiment of the present disclosure may include all the contents described in the method of FIGS. 1 to 10, which is obvious to those skilled in the art in the technical field.

Figure 12:
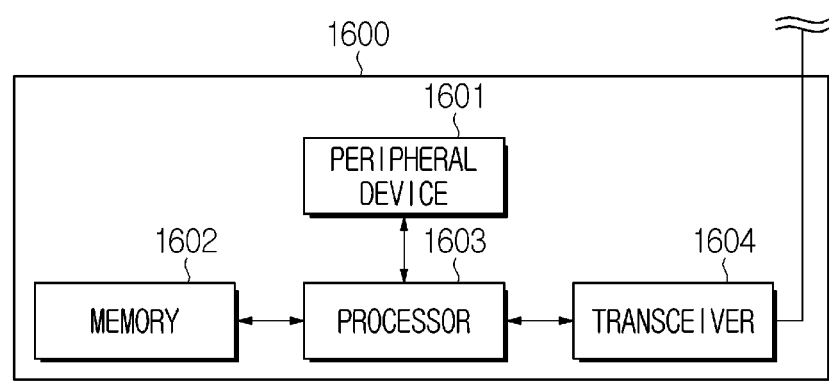
FIG. 12 illustrates a configuration of a device to which a mobile target robot control device according to another embodiment of the present disclosure is applied.

FIG. 12 illustrates a configuration of a device to which a mobile target robot control device according to another embodiment of the present disclosure is applied.

The mobile target robot control device according to another embodiment of the present disclosure of FIG. 11 may be a device 1600 of FIG. 12. Referring to FIG. 12, the device 1600 may include a memory 1602, a processor 1603, a transceiver 1604 and a peripheral device 1601. In addition, for example, the device 1600 may further include another configuration and is not limited to the above-described embodiment. Herein, for example, the device 1600 may be a mobile user terminal (e.g., a smartphone, a laptop, a wearable device, etc.) or a fixed management device (e.g., a server, a PC, etc.).

More specifically, the device 1600 of FIG. 12 may be an exemplary hardware/software architecture such as a sensor calibration device, a sensor calibration system. Herein, as an example, the memory 1602 may be a non-removable memory or a removable memory. In addition, as an example, the peripheral device 1601 may include a display, GPS or other peripherals and is not limited to the above-described embodiment.

In addition, as an example, like the transceiver 1604, the above-described device 1600 may include a communication circuit. Based on this, the device 1600 may perform communication with an external device.

In addition, as an example, the processor 1603 may be at least one of a general-purpose processor, a digital signal processor (DSP), a DSP core, a controller, a micro controller, application specific integrated circuits (ASICs), field programmable gate array (FPGA) circuits, any other type of integrated circuit (IC), and one or more microprocessors related to a state machine. In other words, it may be a hardware/software configuration playing a controlling role for controlling the above-described device 1600. In addition, the processor 1603 may be performed by modularizing the functions of the reference setting unit 1120, the transform unit 1130, the area setting unit 1140 and the controller 1150 of FIG. 11.

Herein, the processor 1603 may execute computer-executable commands stored in the memory 1602 in order to implement various necessary functions of the mobile target robot control device. As an example, the processor 1603 may control at least any one operation among signal coding, data processing, power controlling, input and output processing, and communication operation. In addition, the processor 1603 may control a physical layer, an MAC layer and an application layer. In addition, as an example, the processor 1603 may execute an authentication and security procedure in an access layer and/or an application layer but is not limited to the above-described embodiment.

In addition, as an example, the processor 1603 may perform communication with other devices via the transceiver 1604. As an example, the processor 1603 may execute computer-executable commands so that the mobile target robot control device may be controlled to perform communication with other devices via a network. That is, communication performed in the present invention may be controlled. As an example, the transceiver 1604 may send a RF signal through an antenna and may send a signal based on various communication networks.

In addition, as an example, MIMO technology and beam forming technology may be applied as antenna technology but are not limited to the above-described embodiment. In addition, a signal transmitted and received through the transceiver 1604 may be controlled by the processor 1603 by being modulated and demodulated, which is not limited to the above-described embodiment.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for controlling a mobile target robot for sensor calibration, the method comprising:
   receiving observation data and position data measured by at least one sensor mounted on a mobile target robot from the mobile target robot, while the mobile target robot moves in a certain space where a sensor platform is placed;
   setting a preset position of the sensor platform as origin of coordinates based on the observation data and the position data;
   transforming position of the mobile target robot and position of a mobile target connected to the mobile target robot into position centered on the origin of coordinates;
   setting a virtual reference area for performing sensor calibration based on sensor parameters including at least one of a position, direction, field of view (FOV) or focal length or combination thereof of at least one sensor provided in the sensor platform; and
   controlling the mobile target robot and the mobile target such that the mobile target is located in the set virtual reference area based on the transformed position of the mobile target robot and the transformed position of the mobile target.

2. The method of claim 1, wherein the transforming comprises transforming the position of the mobile target into position centered on the origin of coordinates, based on the position of the mobile target centered on the mobile target robot, the transformed position of the mobile target robot and transform information set to match coordinates of the sensor platform with the mobile target robot, and calculating a direction vector of the mobile target centered on the origin of coordinates based on a direction vector of the mobile target centered on the mobile target robot and the transform information.

3. The method of claim 1, wherein the setting as the origin of coordinates comprises setting the origin of coordinates through user input when a graphic user interface (GUI) for the sensor platform is provided by the observation data.

4. The method of claim 1, wherein the setting as the origin of coordinates comprises, when the observation data is measured by a LiDAR and a camera and the sensor platform is a vehicle, three-dimensionally modeling the vehicle based on the observation data, detecting rear wheels of the vehicle through the three-dimensional modeling, and automatically setting coordinate information between the detected rear wheels as the origin of coordinates.

5. The method of claim 1, wherein the setting the virtual reference area comprises setting the virtual reference area in consideration of the FOV and focal length of the at least one sensor.

6. The method of claim 1, wherein the setting the virtual reference area comprises, when the sensor platform includes a LiDAR sensor and a camera sensor, setting the virtual reference area in consideration of a FOV of the LiDAR sensor and a FOV of the camera sensor.

7. The method of claim 6, wherein the setting the virtual reference area comprises determining a distance between the LiDAR sensor and the mobile target and a distance between the camera sensor and the mobile target in consideration of an area of interest of the LiDAR sensor and a focal length of the camera sensor and setting the virtual reference area using each of the determined distances, the FOV of the LiDAR sensor and the FOV of the camera sensor.

8. The method of claim 6, wherein the setting the virtual reference area comprises setting each of an area where the FOV of the LiDAR sensor and the FOV of the camera sensor overlap, a FOV area of only the LiDAR sensor and a FOV area of only the camera sensor as the virtual reference area.

9. The method of claim 1, wherein the controlling comprises controlling the mobile target robot and the mobile target to satisfy a condition that an error between position of the virtual reference area and position of the mobile target centered on the origin of coordinates is smaller than a preset position error and an error between a direction vector of the virtual reference area and a direction vector of the mobile target centered on the origin of coordinates is smaller than a preset direction error.

10. The method of claim 9, wherein the controlling comprises, when there is a combination satisfying the condition among combinations of joint angles of a manipulator attached to the mobile target robot to control an angle of the mobile target, controlling the joint angles of the manipulator such that the mobile target is located in the virtual reference area, after controlling the position of the mobile target robot.

11. The method of claim 10, wherein the controlling comprises, when there is no combination satisfying the condition among the combinations of the joint angles of the manipulator, initializing the joint angles of the manipulator, adjusting the position of the mobile target robot by a certain interval and then performing a process of determining whether there is a combination satisfying the condition again.

12. A device for controlling a mobile target robot for sensor calibration, the device comprising:
  a reception unit configured to receive observation data and position data measured by at least one sensor mounted on a mobile target robot from the mobile target robot, while the mobile target robot moves in a certain space where a sensor platform is placed;
  a reference setting unit configured to set a preset position of the sensor platform as origin of coordinates based on the observation data and the position data;
  a transform unit configured to transform position of the mobile target robot and position of a mobile target connected to the mobile target robot into position centered on the origin of coordinates;
  an area setting unit configured to set a virtual reference area for performing sensor calibration based on sensor parameters including at least one of a position, direction, field of view (FOV) or focal length or combination thereof of at least one sensor provided in the sensor platform; and
  a controller configured to control the mobile target robot and the mobile target such that the mobile target is located in the set virtual reference area based on the transformed position of the mobile target robot and the transformed position of the mobile target.

* * * * *